(12) United States Patent
Gangakhedkar et al.

(10) Patent No.: US 8,695,176 B2
(45) Date of Patent: Apr. 15, 2014

(54) ADJUSTABLE TARP STRAP

(75) Inventors: Dhananjay Gangakhedkar, Twinsburg, OH (US); Matt Romanak, Garfield Hts., OH (US)

(73) Assignee: Cequent Consumer Products, Solon, OH (US)

( * ) Notice: Subject to any disclaimer, the term of this patent is extended or adjusted under 35 U.S.C. 154(b) by 580 days.

(21) Appl. No.: 12/835,249

(22) Filed: Jul. 13, 2010

(65) Prior Publication Data
US 2011/0005041 A1    Jan. 13, 2011

Related U.S. Application Data

(60) Provisional application No. 61/270,762, filed on Jul. 13, 2009.

(51) Int. Cl.
*A44B 11/28* (2006.01)
*B60P 7/06* (2006.01)

(52) U.S. Cl.
USPC ............... 24/265 H; 24/302; 24/319

(58) Field of Classification Search
USPC ........ 24/265 H, 318, 319, 343, 346, 300–302
See application file for complete search history.

(56) References Cited

U.S. PATENT DOCUMENTS

| | | | | |
|---|---|---|---|---|
| 2,442,266 A * | 5/1948 | Davis | | 24/68 CD |
| 3,290,743 A * | 12/1966 | Hanson | | 24/301 |
| 4,432,121 A * | 2/1984 | Dupre | | 24/343 |
| 4,507,829 A * | 4/1985 | Looker | | 24/68 CD |
| 4,622,724 A * | 11/1986 | Dupre | | 24/343 |
| 4,918,790 A * | 4/1990 | Cirket et al. | | 24/68 CD |
| 5,084,946 A * | 2/1992 | Lee | | 24/615 |
| 5,168,605 A * | 12/1992 | Bartlett | | 24/300 |
| 5,283,930 A | 2/1994 | Krauss | | |
| 5,380,067 A * | 1/1995 | Turvill et al. | | 297/484 |
| 5,669,119 A | 9/1997 | Seron | | |
| 6,012,204 A * | 1/2000 | Roethler | | 24/129 R |
| 6,049,950 A | 4/2000 | Cavallo | | |
| 6,094,784 A | 8/2000 | Schrader | | |
| 6,292,984 B1 | 9/2001 | Nelson | | |
| 6,308,383 B1 | 10/2001 | Schrader | | |
| 6,401,309 B1 * | 6/2002 | Yang | | 24/265 H |
| 6,615,456 B1 * | 9/2003 | Huang | | 24/193 |
| 6,665,913 B2 * | 12/2003 | Kosh et al. | | 24/193 |
| 6,802,109 B2 | 10/2004 | Hede et al. | | |
| 6,851,163 B2 | 2/2005 | Selby | | |
| 7,020,933 B2 * | 4/2006 | Chang | | 24/68 CD |
| D550,543 S | 9/2007 | Selby | | |
| 7,287,303 B2 | 10/2007 | Yang | | |
| 2005/0160564 A1 * | 7/2005 | Hsu | | 24/318 |
| 2006/0085956 A1 | 4/2006 | Stevens | | |

* cited by examiner

*Primary Examiner* — Robert J Sandy
(74) *Attorney, Agent, or Firm* — McDonald Hopkins LLC

(57) ABSTRACT

An adjustable tarp strap assembly is described herein. The adjustable tarp strap assembly may include a buckle assembly a strap and a securing strap. The buckle assembly may include a first slot, a second slot, a tab and a catch. The tarp strap assembly may also include a hook secured to the buckle assembly. The strap may include a first end and a second end, wherein the first end may be intertwined within the slots. The securing strap may include a first aperture and a second aperture, wherein the first aperture may be engaged with the tab and the second aperture may be engaged with the catch. The securing strap may secure the strap within the buckle assembly. The strap may include a length that may be adjustable within the slots.

26 Claims, 5 Drawing Sheets

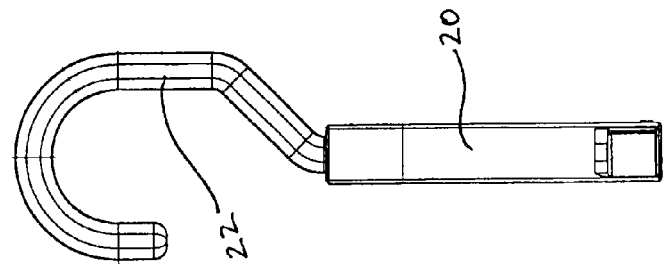
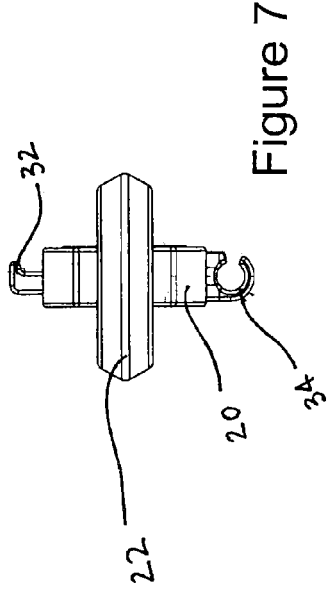
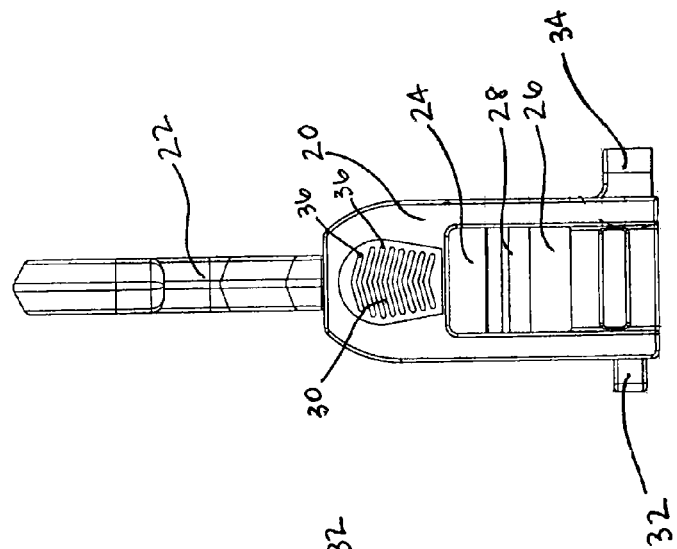
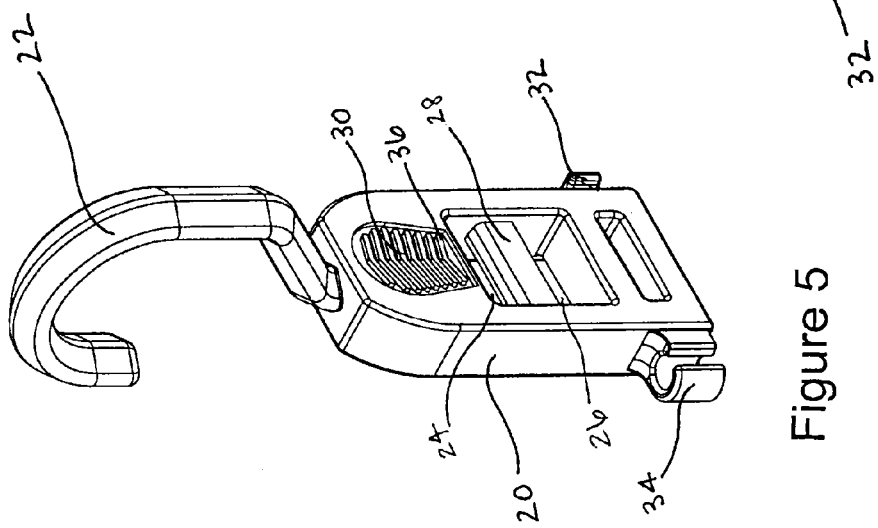

ADJUSTABLE TARP STRAP

CROSS-REFERENCE TO RELATED APPLICATION

This application claims benefit from U.S. Provisional Patent Application No. 61/270,762, entitled "Adjustable Tarp Strap," filed on Jul. 13, 2009, which is hereby incorporated by reference in its entirety.

FIELD OF INVENTION

The present invention relates generally to tie-down devices and, more particularly, to adjustable tightening straps for restraining cargo and the like.

BACKGROUND

Typically, various types of tie down devices have been utilized to secure an object with respect to a fixed reference point. Such tie down devices may generally be attached at one end to the object to be secured and at an opposite end to the fixed reference point. Traditional tie down devices often utilize a strap, such as a rope or a vinyl band, to hold the object. Elastic chords, such as bungee chords, however, may also be used to provide flexibility in the length of the tie down device.

Generally, straps or bungee cords are commercially available in a variety of lengths or may be custom made to any desired length. Bungee cords of a particular length, however, are only functional within a limited elastic range for that particular length. Therefore, it may be desirable to provide an adjustable bungee cord to permit a wider range of functionality, as well as reduce the quantity of bungee cords needed for common applications, such as the transportation of goods.

Various types of adjustable elastic tie down chords have been developed. Many of these adjustable chords, however, may suffer from design deficiencies. For example, many adjustable chords may include complex components and complicated moving pieces. These complex designs increase the overall cost and further complicate the process of adjusting and tightening a strap. Other adjustable chord designs often fail to properly secure the strap at the desired location, thus allowing the chord to loosen or become detached.

SUMMARY

An adjustable tarp strap assembly is described herein. The adjustable tarp strap assembly may include a buckle assembly a strap and a securing strap. The buckle assembly may include a first slot, a second slot, a tab and a catch. The tarp strap assembly may also include a hook secured to the buckle assembly. The strap may include a first end and a second end, wherein the first end may be intertwined within said slots. The securing strap may include a first aperture and a second aperture, wherein the first aperture may be engaged with the tab and the second aperture may be engaged with the catch. The securing strap may secure the strap within the buckle assembly. The strap may include a length that may be adjustable within the slots.

DESCRIPTION OF THE DRAWINGS

Objects and advantages together with the operation of the invention may be better understood by reference to the following detailed description taken in connection with the following illustrations, wherein:

FIG. 5 illustrates a perspective view of a buckle body of the buckle assembly of FIG. 3.

FIG. 6 illustrates a front view of the buckle body of FIG. 5.

FIG. 7 illustrates a top view of the buckle body of FIG. 5.

FIG. 8 illustrates a side view of the buckle body of FIG. 5.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

Figures 1, 2:
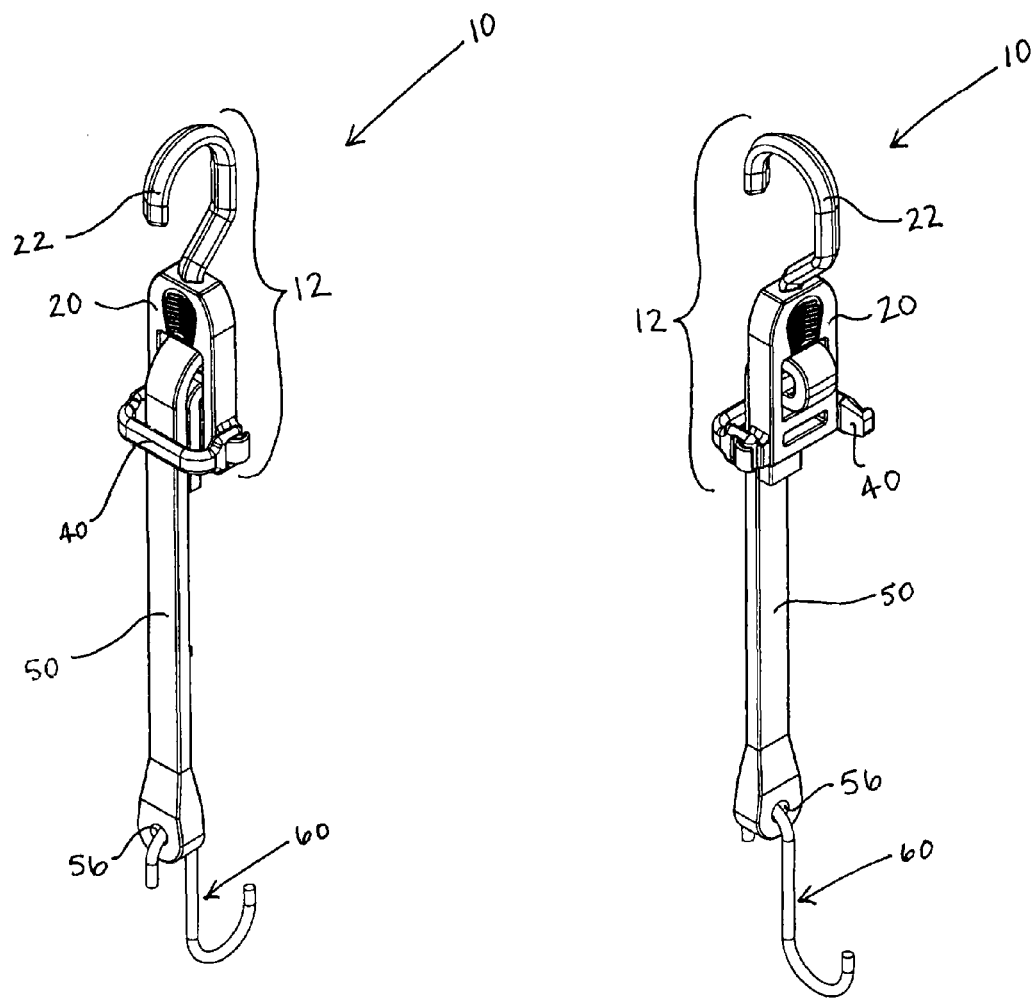
FIG. 1 illustrates a perspective view of an adjustable tarp strap assembly.
FIG. 2 illustrates another perspective view of the adjustable tarp strap assembly of FIG. 1.

An adjustable tarp strap assembly 10 is illustrated in FIGS. 1 and 2. The adjustable tarp strap assembly 10 may be operable to secure a variety of objects to a fixed reference point. In a non-limiting example, the adjustable tarp strap assembly 10 may be utilized to adjustably secure a load of cargo or device to a trailer or vehicle, such as the bed of a truck or other similar structure. The adjustable tarp strap assembly 10 may be of any appropriate shape, size, type or configuration. The adjustable tarp strap assembly 10 may include a buckle assembly 12 and a length of material, such as a strap 50 (FIGS. 1 and 2).

The buckle assembly 12 may be of any appropriate shape, size, type or configuration. The buckle assembly 12 may be fabricated out of any appropriate type of materials. For example, the buckle assembly 12 may be fabricated from polypropylene with an inner steel wire core. The buckle assembly 12 may include a buckle body 20, a hook 22 and a securing strap 40 (FIGS. 1-4).

The buckle body 20 and the hook 22 may be an integrally formed single component or may be separate components that may be secured together by any appropriate means, such as with fasteners, adhesives or the like. The buckle body 20 may be configured to adjustably retain the strap 50 therein. The hook 22 may be configured to connect to an anchoring device such as a U-shaped bracket (not shown).

The hook 22 may be of any appropriate shape, size, type or configuration. For example, the hook 22 may be of a generally curved C-shape (FIGS. 1-5 and 8). For example, the hook 22 may be generally curved to define an opening. The hook 22 may be located at any appropriate position on the buckle assembly 12, such as adjacent to the buckle body 20 (FIGS. 1-6 and 8). An anchoring device or other fixed object may be held or retained by the curved portion of the hook 22. As an alternative, the hook 22 may further include a retaining member (not shown). The retaining member may be movably connected to the hook 22 and capable of selectively closing the opening within the C-shape of the hook 22.

The buckle body 20 may be of any appropriate shape, size, type or configuration. For example, the buckle body 20 may be of a generally rectangular shape (FIGS. 1-6). The buckle body 20 may be located at any appropriate position on the buckle assembly 12, such as adjacent to the hook 22. The buckle body 20 may include at least one slot 24. For example, the buckle body 20 may include any appropriate number of slots, such as a first slot 24 and a second slot 26 (FIGS. 3-6). The buckle body 20 may also include a partition or divider 28. While the adjustable tarp strap assembly 10 is described as including two slots 24, 26, it is to be understood that the adjustable tarp strap assembly 10 may include any appropriate number of slots and partitions.

The first slot 24 may be of any appropriate shape or size. For example, the first slot 24 may be of a generally square or rectangular shape. The first slot 24 may be shaped and sized to receive the strap 50. The first slot 24 may be located at any appropriate position on the buckle body 20, such as within a generally central location of the buckle body 20 (FIGS. 3-6).

The second slot 26 may be of any appropriate shape or size. For example, the second slot 26 may be of a generally square or rectangular shape. The second slot 26 may be shaped and sized to receive the strap 50. The second slot 26 may be of a similar or different shape and size as that of the first slot 26. The second slot 26 may be located at any appropriate position on the buckle body 20, such as within a generally central location of the buckle body 20 and adjacent the first slot 24 (FIGS. 3-6).

The partition or divider 28 may be of any appropriate shape, size, type or configuration. For example, the partition 28 may be of a generally square, rectangular or cylindrical shape. The partition 28 may be located at any appropriate position on the buckle body 20, such as adjacent to and located between the first slot 24 and second slot 26 (FIGS. 3-6).

The buckle body 20 may include at least one gripping portion 30 (FIGS. 3-6). For example, the buckle body 20 may include a pair of gripping portions 30. The gripping portions 30 may be of any appropriate shape, size, type or configuration. For example, the gripping portions 30 may be of a generally polygonal shape, such as ovular, circular, rectangular or the like. The gripping portions 30 may include a plurality or ribs 36 (FIGS. 5 and 6).

The gripping portion 30 may be located at any appropriate position on the buckle body 20, such as towards an end of the buckle body 20. For example, the gripping portions 30 may be located adjacent the hook 22 and the first slot 24 (FIGS. 3-6). In addition, one gripping portion 30 may be located on each side of the buckle body 20. The gripping portions 30 may aid the user in positioning the adjustable tarp strap assembly 10 during use.

The buckle body 20 may include a tab 32 (FIGS. 3-7). The tab 32 may be of any appropriate shape, size, type or configuration. For example, the tab 32 may be of a generally rectangular shape with a pointed end. The tab 32 may be located at any appropriate position on the buckle body 20, such as adjacent to an end of the buckle body 20 and opposite that of the hook 22.

The buckle body 20 may also include a catch 34 (FIGS. 3-7). The catch 34 may be of any appropriate shape, size, type or configuration. For example, the catch 34 may be of a generally curved or C-shape. The catch 34 may be located at any appropriate position on the buckle body 20, such as adjacent to and end of the buckle body 20 and opposite that of the hook 22. For example, the catch 34 may be located on an opposite side of the buckle body 20 to that of the tab 32 (FIGS. 3-7).

Figure 10:
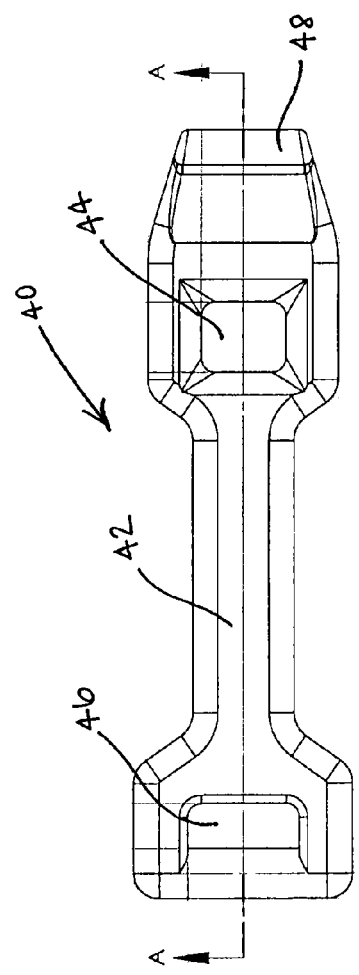
FIG. 10 illustrates a top view of the securing strap of FIG. 9.

The securing strap 40 may be of any appropriate shape, size, type or configuration. For example, the securing strap 40 may be of a generally rectangular shape (FIGS. 1 and 10). The securing strap 40 may be fabricated out of any appropriate type of material, such as a thermoplastic rubber material. The securing strap 40 may be located at any appropriate position on the buckle body 20, such as adjacent an end of the buckle body 20 opposite that of the hook 22 (FIGS. 1-4).

Figure 11:
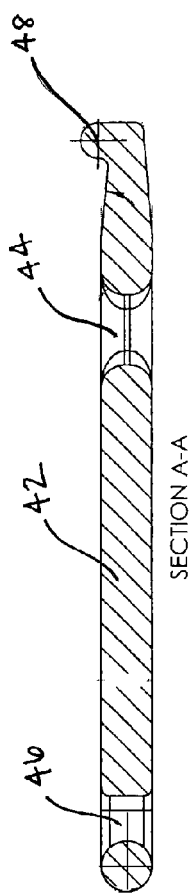
FIG. 11 illustrates a sectional view taken along Section A-A of FIG. 10.

The securing strap 40 may include a central portion 42, at least one aperture and a nub 48. For example, the securing strap 40 may include a first or tab aperture 44, a second or catch aperture 46 (FIGS. 10 and 11). The central portion 42 may be of any appropriate shape or size, such as a generally square or rectangular shape. The central portion 42 may be located at any appropriate position on the securing strap 40, such as at the approximate center of the securing strap 40 and located between the tab aperture 44 and the catch aperture 46.

The first or tab aperture 44 may be of any appropriate shape or size, such as a generally circular, square or rectangular shape (FIG. 10). For example, the tab aperture 44 may be shaped and sized to be able to engage with the tab 32 of the buckle body 20. The tab aperture 44 may be located at any appropriate position on the securing strap 40, such as located adjacent an end of the securing strap 40.

The second or catch aperture 46 may be of any appropriate shape or size, such as a generally circular, square or rectangular shape (FIG. 10). For example, the catch aperture 46 may be shaped and sized to be able to engage with the catch 34 of the buckle body 20. The catch aperture 46 may be located at any appropriate position on the securing strap 40, such as located adjacent an end of the securing strap 40 opposite that of the tab aperture 44.

The nub 48 may be of any appropriate shape or size, such as a generally cylindrical shape. The nub 48 may be located at any appropriate position on the securing strap 40, such as located at an end of the securing strap and adjacent the tab aperture 44 (FIGS. 9-12). The nub 48 may be utilized by the user to aid in attaching the securing strap 40 to the buckle body 20.

Figure 4:
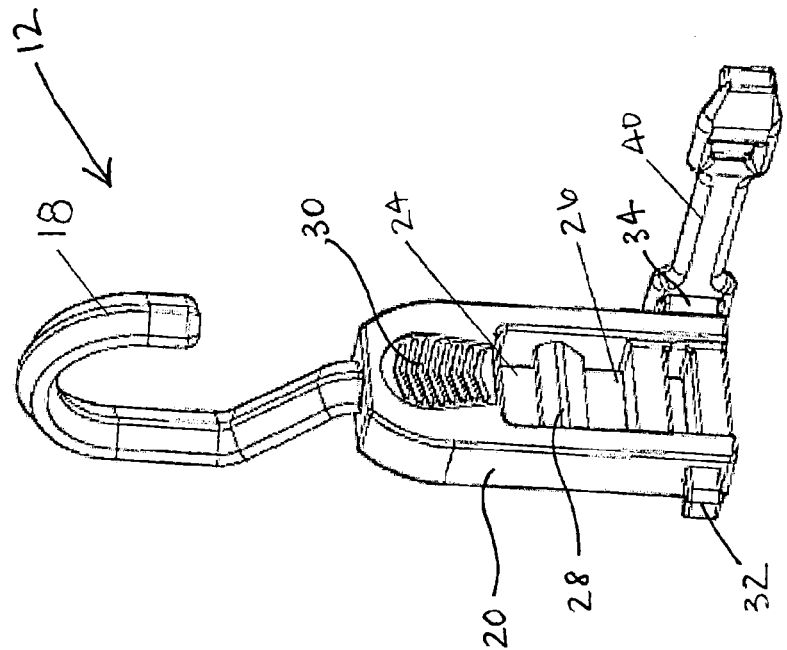
FIG. 4 illustrates another perspective view of the buckle assembly of the adjustable tarp strap assembly of FIG. 1 with the securing strap in an unsecured position.
Figure 3:
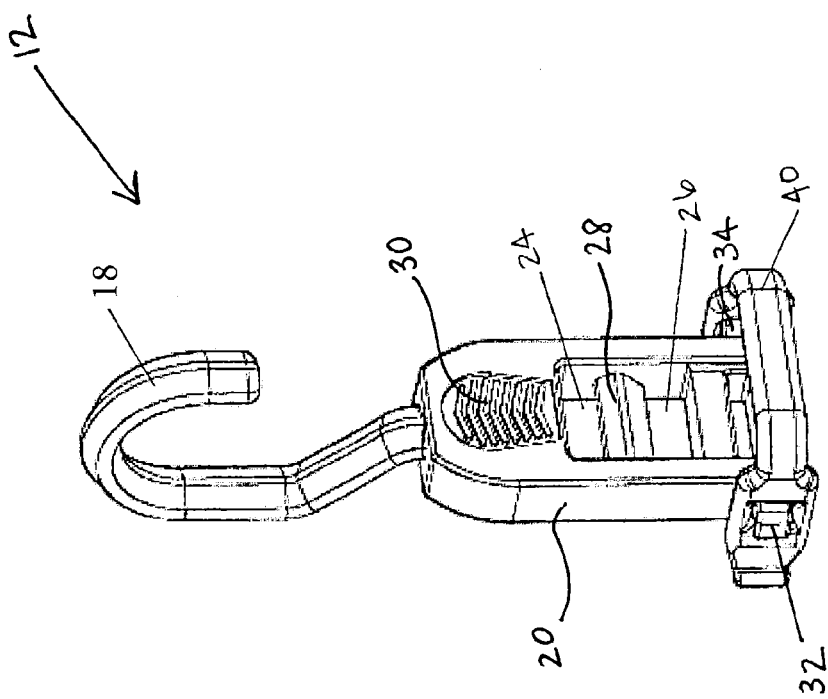
FIG. 3 illustrates a perspective view of a buckle assembly of the adjustable tarp strap assembly of FIG. 1 with a securing strap in a secured position.
Figure 12:
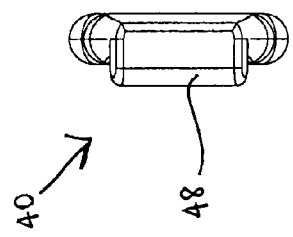
FIG. 12 illustrates a side view of the securing strap of FIG. 9.
Figure 9:
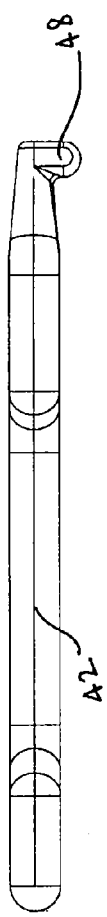
FIG. 9 illustrates a front view of the securing strap of the buckle assembly of FIG. 3.

In use, the securing strap 40 may be utilized to restrain the strap 50 and prevent movement of the strap 50 with respect to the buckle body 20. For example, the tab aperture 44 of the securing strap 40 may be engaged with and secured to the tab 32 of the buckle body 20 and the catch aperture 46 of the securing strap 40 may be engaged with and secured to the catch 34 of the buckle body 20, whereby the securing strap 40 may be moveable between an opened position and a closed position in relation to the buckle body 20 (FIGS. 3 and 4).

For example, the securing strap 40 may be rotated about the buckle body 20 to an opened position to allow the strap 50 to be inserted through the first slot 24 and second slot 26 and adjusted to the desired length (FIGS. 1 and 2). The securing strap 40 may then be rotated to a closed position and secured to the buckle body 20 (FIGS. 1-3). In the closed position, the securing strap 40 may hold the strap 50 tightly to prevent the strap 50 from moving with respect to the buckle body 20. As an alternative, the securing strap 40 may also be utilized with fasteners (not shown), such as a clasp or a clip, to more permanently secure the securing strap 40 to the buckle body 20 and prevent it from moving.

Figure 13:
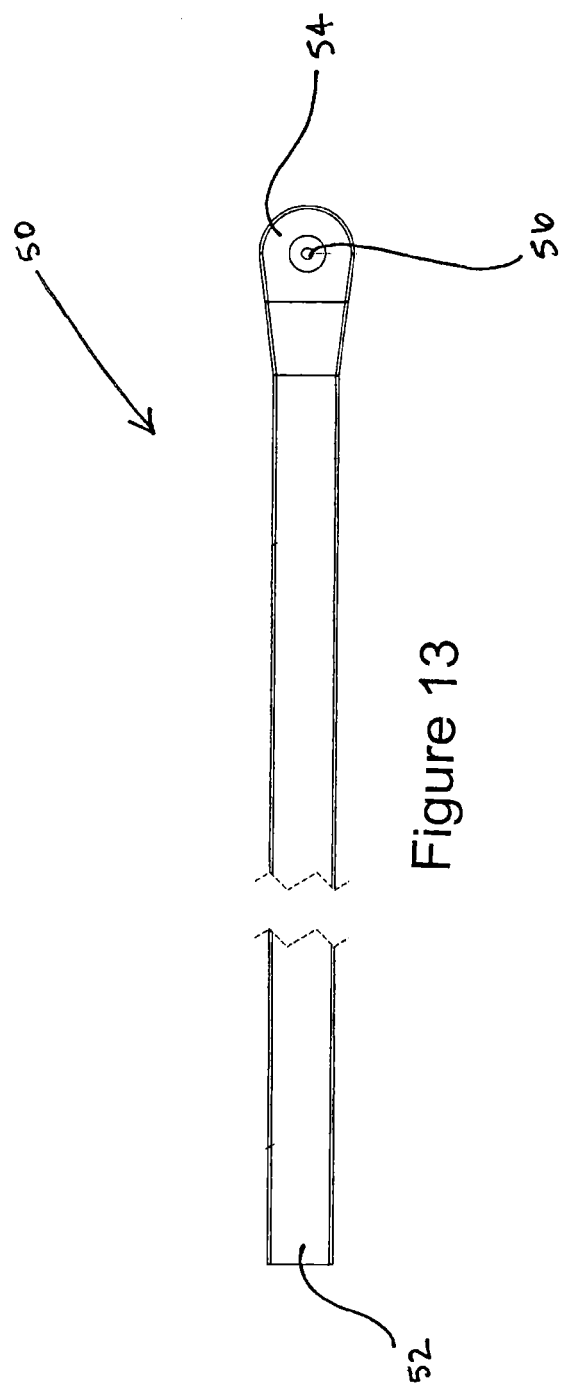
FIG. 13 illustrates a front view of a strap of the adjustable tarp strap assembly of FIG. 1.

The strap 50 may be of any appropriate shape, size, type or configuration, such as a generally rectangular piece of material (FIGS. 1, 2 and 13). For example, the strap 50 may be of any appropriate or desired length, such as approximately between 40-50 inches. The strap 50 may be fabricated out of any appropriate type of material, such as an elastomer, a vinyl band, rope or an elastic material, such as a bungee chord or rubber banding. For example, the strap 50 may be fabricated out of an ethylene propylene diene monomer (EPDM) rubber.

The strap 50 may include a first end 52, a second end 54 and at least one aperture 56 (FIG. 13). The aperture 56 may be of any appropriate shape or size, such as a generally circular shape. The aperture 56 may be located at any appropriate position on the strap 50, such as adjacent the second end 54.

The strap 50 may be secured to or engaged with the buckle assembly 12 by any appropriate means. For example, the strap 50 may be adjustably connected to the buckle body 20. The first end 52 of the strap 50 may be engaged with or connected to the buckle body 20 and the second end 54 of the strap 50 may be connected to or engaged with another connecting device 60 (FIGS. 1 and 2).

For example, the adjustable tarp strap assembly 10 may include a fastening device 60. The fastening device 60 may be of any appropriate shape, size, type or configuration, such as a hook, clasp, fastener, or other connecting device. The fastening device 60 may be secured to the strap 50 by any appropriate means, such as being located through the strap aperture 56 (FIGS. 1 and 2). As an alternative, the second end 54 of the strap 50 may be integrally formed with an anchoring device.

In use, and in a non-limiting example, the buckle body 20 may be configured to receive and selectively adjust the length the strap 50. For example, the strap 50 may be looped through the first slot 24 and second slot 26 to adjust the length of the strap 50. The strap 50 may be fed through the first slot 24, located around the partition 28, and received back through the second slot 26 (FIGS. 1 and 2). The length of the strap 50 may be adjusted by feeding a greater or lesser portion of the strap 50 through the slots 24, 26.

Although the embodiments of the present invention have been illustrated in the accompanying drawings and described in the foregoing detailed description, it is to be understood that the present invention is not to be limited to the embodiments disclosed, but that the invention described herein is capable of numerous rearrangements, modifications and substitutions without departing from the scope of the claims hereafter.

Having thus described the invention, the following is claimed:

1. An adjustable tarp strap assembly comprising:
   a buckle assembly including a first slot, a second slot and at least one engaging device;
   a resilient strap having a first end and a second end, wherein said first end is engaged with said slots; and
   a securing member having a first aperture, wherein said aperture of said securing member is engaged with said at least one engaging device whereby said securing member maintains said resilient strap in a predetermined position relative to said first and second slots.

2. The adjustable tarp strap assembly of claim 1, wherein said buckle assembly includes an engaging member whereby said securing member maintains said resilient strap generally planar relative to said engaging member.

3. The adjustable tarp strap assembly of claim 1, wherein said buckle assembly includes a catch.

4. The adjustable tarp strap assembly of claim 3, wherein said securing member includes a second aperture.

5. The adjustable tarp strap assembly of claim 4 wherein said second aperture is engaged with said catch.

6. The adjustable tarp strap assembly of claim 1, wherein said securing member is a resilient member.

7. The adjustable tarp strap assembly of claim 6, wherein said resilient member is a second strap whereby said second strap and said resilient strap are of equivalent material.

8. The adjustable tarp strap assembly of claim 1, wherein said securing member orients said first end of said resilient strap along a length of said resilient strap toward said second end.

9. The adjustable tarp strap assembly of claim 1, wherein said resilient strap includes a length, whereby said resilient strap is adjustable at any increment of said length.

10. The adjustable tarp strap assembly of claim 1, wherein said securing member maintaining said resilient strap in said predetermined position prevents said resilient strap from sliding through said first and second slots when under tension.

11. An adjustable tarp strap assembly comprising:
    a buckle body including a first slot and a second slot;
    an engaging member secured to said buckle body;
    a resilient strap intertwined within said slots; and
    a securing member engaged with said buckle body selectively contacting, holding and maintaining said resilient strap in a predetermined orientation relative to said engaging member.

12. The adjustable tarp strap assembly of claim 11, wherein said buckle body includes an engaging device and a catch located on opposite sides of said buckle body.

13. The adjustable tarp strap assembly of claim 12, wherein said securing strap includes a first aperture and a second aperture.

14. The adjustable tarp strap assembly of claim 13, wherein said first aperture is engaged with said engaging device and said second aperture is engaged with said catch.

15. The adjustable tarp assembly of claim 11, wherein said securing member maintains said resilient strap in a predetermined position relative to said first and second slots.

16. The adjustable tarp strap assembly of claim 11, wherein said securing member selectively holding and maintaining said resilient strap in said predetermined orientation prevents said resilient strap from sliding through said first and second slots when under tension.

17. The adjustable tarp strap assembly of claim 11, wherein said resilient strap includes first and second ends whereby said second end includes a second engaging member and said first end is a free end.

18. The adjustable tarp strap assembly of claim 11, wherein said securing member includes a resilient strap selectively engaged with said buckle body.

19. The adjustable tarp strap assembly of claim 11, wherein the engaging member includes a hook.

20. The adjustable tarp strap assembly of claim 11, wherein said securing member contacting said resilient strap directs said resilient strap toward said buckle body.

21. The adjustable tarp strap assembly of claim 11, wherein said securing member contacting said resilient strap applies pressure to said resilient strap.

22. An adjustable tarp strap assembly comprising:
    a body having first and second resilient strap engaging devices;
    an engaging member attached with said body;
    a resilient strap having first and second ends, wherein said resilient strap is selectively engaged with said first and second resilient strap engaging devices; and
    a securing member engaged with said body selectively contacting, holding and maintaining said resilient strap in a predetermined orientation relative to said engaging member, wherein said resilient strap is prevented from moving from engagement with said first and second resilient strap engaging devices against a tensile load.

23. The adjustable tarp strap assembly of claim 22, wherein said first end of said resilient strap is a free end engaged with said first and second resilient strap engaging devices and said second end includes a second engaging member.

24. The adjustable tarp strap assembly of claim 23, wherein said securing member orients said first end of said resilient strap along a length of said resilient strap toward said second end.

25. The adjustable tarp strap assembly of claim 22, wherein said securing member contacting said resilient strap directs said resilient strap toward said body.

26. The adjustable tarp strap assembly of claim 22, wherein said securing member contacting said resilient strap applies pressure to said resilient strap.

\* \* \* \* \*